United States Patent [19]

Kornrumpf et al.

[11] 3,819,938
[45] June 25, 1974

[54] OPTO-ELECTRONIC TRANSDUCERS FOR OBJECT DETECTION

[75] Inventors: William P. Kornrumpf; John D. Harnden, Jr., both of Schenectady, N.Y.

[73] Assignee: General Electric Company, Schenectady, N.Y.

[22] Filed: Feb. 1, 1973

[21] Appl. No.: 328,530

[52] U.S. Cl. ......... 250/222 R, 250/211 R, 250/553, 250/568
[51] Int. Cl. ............................................. G01p 3/68
[58] Field of Search ........ 250/217 SS, 211 R, 211 J, 250/203, 239, 216, 552, 553, 221, 222 R, 568, 589, 570; 317/235 N

[56] References Cited
UNITED STATES PATENTS

| | | | |
|---|---|---|---|
| 3,194,969 | 7/1965 | Chute | 250/216 |
| 3,366,793 | 1/1968 | Svedberg | 250/217 SS X |
| 3,381,133 | 4/1968 | Barnes et al. | 250/203 |
| 3,432,671 | 3/1969 | Edmonds | 250/216 X |
| 3,443,166 | 5/1969 | Ing, Jr. et al. | 250/211 J X |
| 3,697,762 | 10/1972 | Hurtz | 250/239 X |

OTHER PUBLICATIONS
Yu: IBM Technical Disclosure Bulletin; Vol. 6, No. 4; Sept. 1963; pg. 63.

*Primary Examiner*—Walter Stolwein
*Attorney, Agent, or Firm*—Paul I. Edelson; Joseph T. Cohen; Jerome C. Squillaro

[57] ABSTRACT

A coaxial opto-electronic transducer adapted for fabrication by integrated circuit techniques is disclosed. A semiconductor light source is disposed on a base member. A support member having a void therein is disposed about the semiconductor light source on the base member. A polycrystalline photoresponsive device is located on the support member proximately the void therein. Light emitted by the light source is reflected from an object in the path of propagation of the light and a portion of the reflected light is directed onto the photoresponsive device. Since the polycrystalline photoresponsive device is on the order of 1 mil in thickness, and is spaced from the periphery of the void in the support member, the support member serves to prevent direct illumination of the photoresponsive device by light emitted by the semiconductor light source.

15 Claims, 5 Drawing Figures

OPTO-ELECTRONIC TRANSDUCERS FOR OBJECT DETECTION

This invention relates to object detectors. More particularly, this invention relates to active optical transducers in which a beam of energy is directed from an energy source toward the location at which an object to be detected is expected and a portion of the energy reflected from the object is collected by a detector whose output is indicative of the presence or absence of the object.

This invention is related to our copending application Ser. No. 302,523, filed Oct. 31, 1972, and to our concurrently filed application Ser. No. 328,529. These related applications are assigned to the assignee of this invention and are incorporated herein by reference thereto.

Optical object detectors, also known as optical transducers, have found utility in a variety of applications. Examples of these applications include the counting and timing of objects passing through a point on an industrial production line for control purposes, systems for counting patrons entering or leaving commercial establishments, automatic door openers, or the like for persons or vehicles, and intrusion detection systems. These systems may be classified, for convenience of reference, as active systems or passive systems, and as direct beam systems or reflected energy systems. Each of these systems is referred to herein as an optical transducer system. It is to be understood that the word "optical" is used herein to refer to any form of electromagnetic energy which is capable of being focused by lenses and which interacts elastically with opaque objects. As a minimum, these optical systems are to be understood to employ electromagnetic radiation in the far infrared, infrared, visible, and ultraviolet portions of the electromagnetic spectrum or in any combination. Similarly, for convenience, the term "light" is used herein to refer to the electromagnetic energy employed in the systems, it being understood that "light" as used herein refers to electromagnetic energy within the spectral range of far infrared to ultraviolet including, but not limited to, visible light.

Active optical transducer systems are those which include a light source whose emitted energy interacts with the object to be detected. A photodetector receives the energy and provides an output from which is determined whether or not the interaction has taken place and accordingly whether or not the object was present. A passive optical object detection system employs only a photodetector and relies upon perturbation of the ambient light incident on the photodetector by the object to determine whether or not the object is present. In direct beam systems, the object to be detected intervenes between the photodetector and the light source, be the light source ambient or a light emitter included in the system, and the presence of the object is usually indicated by a decrease in the intensity of light incident upon the photodetector. In a reflected energy optical transducer system, the photodetector receives light reflected from the object to be detected and the presence of an object is usually indicated by an increase in the intensity of light incident upon the photodetector; again, the light reflected by the object onto the photodetector may be either ambient light or light from a light source included in the system which is directed onto the object.

Active optical transducers are in general more sensitive than passive optical transducers because, in an active system, light of known spatial, spectral, and intensity characteristics is provided and the photodetector can be constructed to respond specifically to the energy provided. The practically achievable sensitivity of a passive system is limited by the necessity of reducing to an acceptable level false alarms produced by fluctuations in ambient energy level not related to motion of an object to be detected. On the other hand, active systems are in general more expensive than passive systems as a result of the cost of the light source itself, and of the fact that reasonable care is required in optical alignment of the light source and the photodetector. Direct beam systems require that the source of illumination and the photodetector be essentially diametrically opposed across the line of travel of the object to be detected. In some applications, this requirement may be inconvenient. Notably, in some production line control and intrusion detection systems, the requirement that the object to be detected intervene between the source of illumination and the photodetector provides a serious design constraint. In reflected energy systems, on the other hand, the photodetector may be essentially coplanarly located with the illumination source in a plane parallel to the direction of travel of the object to be detected. Since this invention relates to active reflected energy optical transducer systems, further discussion will be limited to such systems.

In prior art active reflected energy optical transducer systems, the light source is typically an incandescent lamp. In a first configuration of prior art systems, the light from the lamp is collimated and directed toward the expected location of an object to be detected by an optical system comprising a reflector, a tube, and a lens system. Light reflected from an object is collected and focused onto a photodetector by a second optical system comprising a tube and lens system. This configuration has the disadvantage of requiring two separate optical systems which are relatively expensive and which must be precisely aligned. In prior art configurations the light source and photodetector cannot share a single telescopic optical system because the physical size of the lens will not permit both the lamp and the photodetector to be sufficiently close to the focal point of a single lens system, nor were point sources nor point detectors available. In another prior art configuration, energy from the lamp is directed onto a half-silvered mirror which reflects it toward the location at which an object to be detected is expected. Light reflected from the object is returned to the half-silvered mirror which transmits it to a photodetector located on the opposite side thereof. This configuration is less expensive than the configuration employing two telescopic optical systems, but still requires critical alignment among the lamp, mirror, and photodetector, and has the further disadvantage of having its sensitivity decreased by a factor of four by the attenuation incident to the use of a half-silvered mirror.

Accordingly, it is an object of this invention to provide an active reflected energy optical transducer which may be simply and inexpensively fabricated using integrated circuit batch fabrication techniques.

Another object is to provide such a transducer in which the light source and photoresponsive devices are very small and positioned closely to each other.

Another object is to provide such a transducer in which a separate barrier member is not required to prevent direct illumination of the photoresponsive device by the light source.

Another object is to provide for the simple and inexpensive fabrication of multi-element arrays of such transducers.

Briefly, and in accordance with one embodiment of this invention, a semiconductor light source is disposed on a base member and surrounded by a support member having a void therein for receiving the semiconductor light source. The support member supports a polycrystalline photoresponsive device in spaced relation to the base member and semiconductor light source and proximately the void in the support member.

In another embodiment of this invention, an array of transducers is provided by disposing a plurality of semiconductor light sources on a single base member and providing a support member having a plurality of voids therein corresponding in number and position to the semiconductor light sources. Each such void has a polycrystalline photoresponsive device proximate thereto on the support member.

The novel features of this invention sought to be patented are set forth with particularity in the appended claims. The invention, together with further objects and advantages thereof, may be understood from a reading of the following specification and appended claims in view of the accompanying drawings in which:

Figure 1:
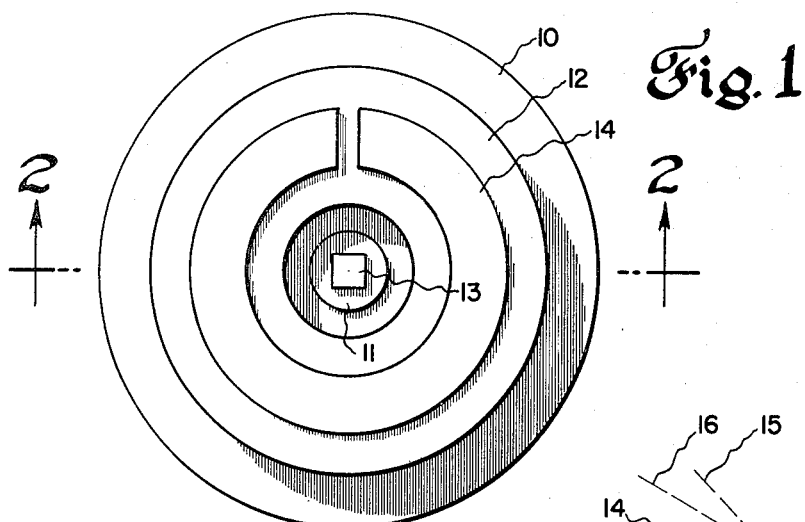
FIG. 1 is a plan view of a transducer in accordance with this invention.
Figure 2:
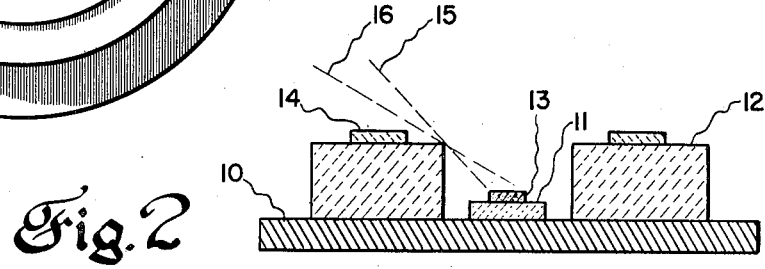
FIG. 2 is a sectional elevation view of the transducer of FIG. 1.

FIGS. 1 and 2 illustrate an embodiment of this invention in which a base member 10 which should be thermally conductive and may conveniently be metallic, has coaxially disposed thereon support members 11 and 12. Support member 11 may conveniently be disk-shaped and may conveniently be a ceramic material. Support member 12 is annular in shape and may conveniently be of the same material as member 11. Members 11 and 12 are preferably formed of thermally conductive, electrically insulating materials and may, for example, conveniently be bodies of beryllium oxide, boron nitride, or alumina. Support member 11 has disposed thereon semiconductor light source 13 which may, for example, be a light-emitting diode. Support member 12 supports, and serves as a substrate for, polycrystalline photoresponsive device 14. Polycrystalline photoresponsive device 14 is illustrated as being annular in shape. The use of an annular photoresponsive device maximizes the sensitivity of the transducer of this invention by maximizing the amount of energy captured by the photoresponsive device; however, this invention is not limited to the use of an annular photoresponsive device and device 14 may, if desired, have any shape, as, for example, a dot of polycrystalline photoresponsive material. If other photoresponsive device geometries are used, support member 12 need not necessarily have a closed upper surface and may, if desired, be, for example, semi-circular or U-shaped. Polycrystalline photoresponsive device 14 may comprise any of the known polycrystalline photoconductive materials surch as, for example, cadmium sulfide, zinc sulfide, zinc selenium, cadmium selenide in pure or copper doped form, or may be polycrystalline silicon.

A characteristic of polycrystalline photoresponsive devices is that they have a thickness dimension characteristic of thick film circuit components. This invention takes advantage of this characteristic by selecting the height of support member 12 so that support member 12 itself prevents direct illumination of photoresponsive device 14 by light emitted by semiconductor light source 13 as illustrated in FIG. 2 by lines 15 and 16. Polycrystalline photoresponsive device 14 may be applied to support member 12 as a substrate by any convenient method, as, for example, by screening, evaporating, or by a process known as doctor blading. The process of doctor blading is no longer commonly employed in the art because of its imprecision relative to other processes, but the imprecision is not a serious drawback in the transducer of this invention and the process offers a cost advantage. The doctor blading process comprises putting a layer of material, for example, cadmium sulfide, on the substrate in a slurry form, scraping the slurry and substrate with a notched blade to form the slurry into the desired device configuration, and firing.

Electrical leads, not shown, are conventionally attached to semiconductor light source 13 for supplying operating power thereto, and to photoresponsive device 14 for reveiving an electrical output therefrom.

Figure 3:
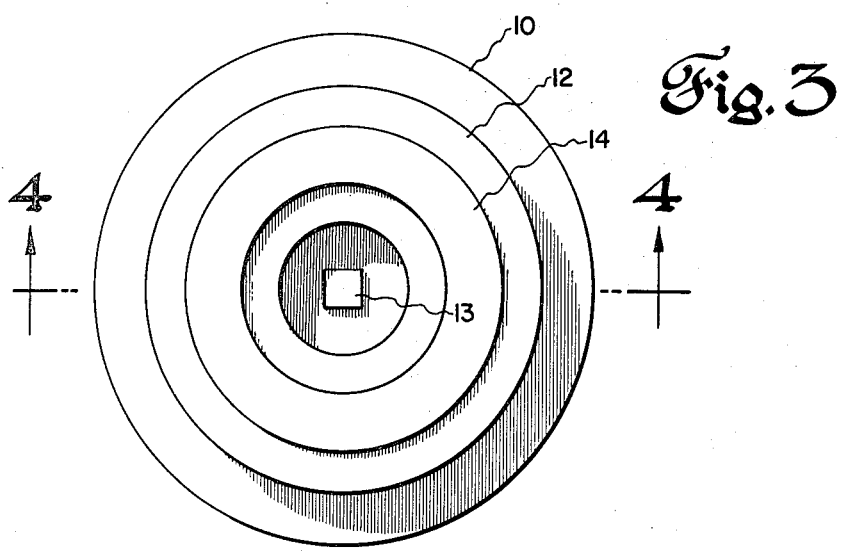
FIG. 3 is a plan view of an alternative embodiment of an opto-electronic transducer in accordance with this invention.
Figure 4:
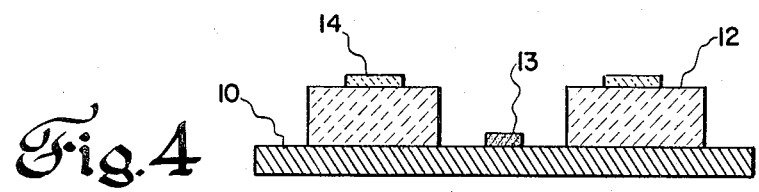
FIG. 4 is a sectional elevation view of the alternative embodiment of FIG. 3.

FIGS. 3 and 4 illustrate an alternative, simplified embodiment of the transducer of this invention. The embodiment of FIGS. 3 and 4 is identical to the embodiment of FIGS. 1 and 2, except support member 11 between semiconductor light source 13 and base member 10 in FIGS. 1 and 2 is eliminated in the FIGS. 3 and 4 embodiment. In the FIGS. 3 and 4 embodiment, semiconductor light source 13 is disposed directly on base member 10 which is preferably a metallic base member. This embodiment is simpler and less expensive to manufacture, improves the heat sinking of semiconductor light source 13, and allows the use of base member 10 itself as one of the electrical contacts to semiconductor light source 13. This embodiment is accordingly preferred in applications in which electrical isolation of base member 10 is not required.

Figure 5:
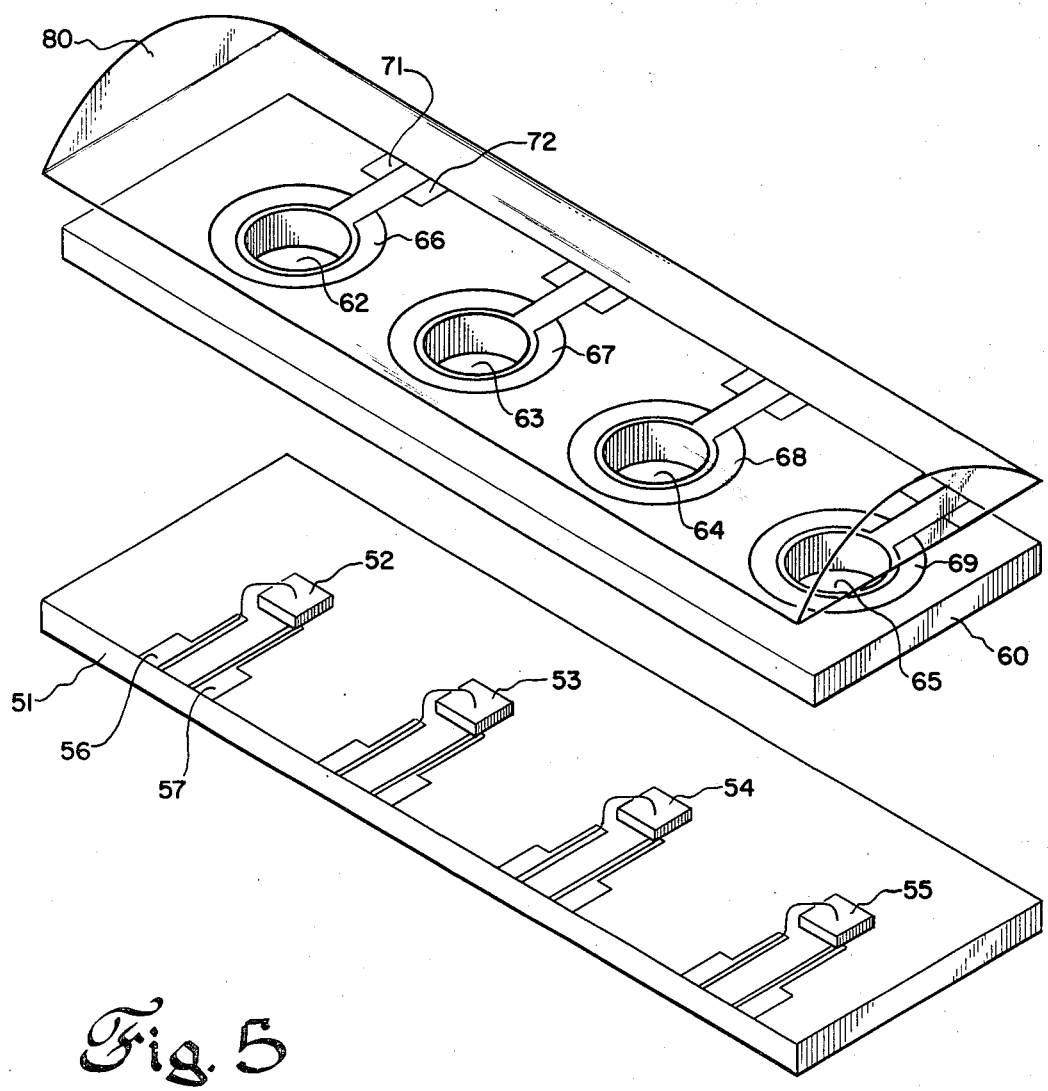
FIG. 5 is a perspective view of a multi-transducer array in accordance with this invention.

FIG. 5 is an exploded perspective view of a multi-transducer array in accordance with this invention. In this embodiment, the base member 51 which is preferably a metallic member having a thin, thermally conductive, electrically insulating layer thereon and may, for example, be anodized aluminum, has a plurality of semiconductor light sources 52, 53, 54, 55 disposed thereon. Alternatively, a base member of electrically insulating, thermally conductive ceramic may be used. For purposes of illustration, a four-element array having four semiconductor light sources is shown. However, it will be obvious to one skilled in the art that this invention is not so limited and any number of elements may be employed. Each semiconductor light source has connected thereto a pair of electrical leads, as for example, leads 56 and 57, connected to semiconductor light source 32 which are conventionally applied over the electrically insulating layer of base member 51 as, for example, by screening. These leads provide for the delivery of operating power to the semiconductor light sources.

A unitary support member 60, which is preferably an electrically insulating thermally conductive member is disposed over base member 51. Support member 60 has a plurality of voids 62, 63, 64, and 65 therein corresponding in number and position to the semiconductor light sources disposed on base member 51. Accordingly, voids 62 through 65 receive therein semiconductor light sources 52 through 55 when support member 60 is attached to base member 51. Support member 60 supports, and serves as a substrate for, a plurality of polycrystalline photoresponsive devices 66, 67, 68, and 69. These photoresponsive devices may be fabricated as discussed above with reference to FIGS. 1 and 2. Each photoresponsive device has a pair of electrodes connected thereto for receiving a signal therefrom. For example, photoresponsive device 66 is connected to electrodes 71 and 72. These electrodes are applied to support member 60 by conventional means, as for example, screening.

In an alternative embodiment of this invention, support member 60 is a wafer of monocrystalline silicon and photoresponsive devices 66, 67, 68, and 69 are formed by, for example, the diffusion of impurities into wafer 60 to form photodiodes or phototransistors. In this case, the upper surfaces of the photoresponsive devices are coplanar with the upper surface of wafer 60. As a modification of this alternative embodiment, member 60 may comprise a wafer, of monocrystalline silicon grown on a substrate of another material, as, for example, sapphire.

The transducer array heretofore described may be used, for example, to read code markings on items passing by the array on a conveyor. A modified embodiment which permits use of the transducer array at greater ranges comprises the addition of focusing means to the array, as, for example, planoconvex cylindrical lens 80 which overlies support member 60.

Returning to FIG. 4, in another alternative embodiment of this invention, base member 10 is a thermally conductive electrically insulating ceramic member and leads for supplying operating power to semiconductor light source 13 are disposed on member 10, as for example, by screening. These leads underlie support member 12 and are brought out at an edge of the device similarly as illustrated in FIG. 5. It will be readily apparent that leads provided in this manner are readily connectable to card connectors or the like. Such card connectors provide for optical alignment of this inventive device within an operating system.

While this invention has been described with reference to particular embodiments and examples, other modifications and variations will appear to those skilled in the art, in view of the above teachings. Accordingly, it should be understood that within the scope of the appended claims, the invention may be practiced otherwise than is specifically described.

The invention claimed is:
1. An active opto-electronic transducer comprising:

a base member;
a semiconductor light source disposed on said base member;
a support member disposed on said base member, said support member having a void for receiving said semiconductor light source therein;
a photoresponsive device disposed on said support member, said photoresponsive device having a height dimension with respect to said support member of less than 1 mil; and
unitary optical transmission means for transmitting light from said semiconductor light source toward locations at which objects to be detected are expected and for transmitting light reflected from said objects as to said photoresponsive device.

2. A transducer as claimed in claim 1 wherein:
said support member is an annular member disposed about said semiconductor light source; and
said photoresponsive device is annular in shape and is disposed on said support member coaxially therewith, said photoresponsive device having a greater minor radius than said support member.

3. A transducer as claimed in claim 1 wherein:
a plurality of said semiconductor light sources are disposed on said base member;
said support member has a plurality of said voids therein corresponding in number and position to said semiconductor light sources; and
a plurality of said photoresponsive devices are disposed on said support member.

4. The transducer of claim 3 wherein said photoresponsive devices are annular in shape and each said photoresponsive device is disposed about a corresponding one of said voids.

5. The transducer of claim 3 wherein said base member is a thermally conductive member to provide cooling of said semiconductor light sources; and said support member comprises thermally conductive electrically insulating material to provide cooling of said photoresponsive devices and electrical isolation among said photoresponsive devices and between said photoresponsive devices and said semiconductor light sources.

6. The transducer of claim 5 wherein said base member comprises metal and said support member comprises a material selected from the group consisting of beryllium oxide, boron nitride, and alumina.

7. The transducer of claim 3 wherein:
said unitary optical means comprises unitary optical focusing means for directing light from said semiconductor light sources toward locations at which objects to be detected are expected and for focusing light reflected from said objects onto said photoresponsive devices.

8. The transducer of claim 7 wherein said unitary optical focusing means is a cylindrical lens having a convex surface.

9. A transducer as claimed in claim 1 wherein:
said base member is a thermally conductive member to provide cooling of said semiconductor light source; and
said support member comprises thermally conductive electrically insulating material to provide cooling of said photoresponsive device and electrical isolation between said photoresponsive device and said semiconductor light source.

10. The transducer of claim 9 wherein said support member is a ceramic support member.

11. The transducer of claim 10 wherein said ceramic is selected from the group consisting of beryllium oxide, boron nitride, and alumina.

12. The transducer of claim 9 wherein said photoresponsive device is a polycrystalline photoresponsive device.

13. A transducer as claimed in claim 1 wherein said support member includes a wafer of monocrystalline silicon and said photoresponsive device comprises an impurity region in said wafer.

14. A transducer as claimed in claim 1 wherein said support member includes a sapphire substrate having monocrystalline silicon thereon and said photoresponsive device comprises an impurity region in said silicon.

15. A transducer as claimed in claim 1 including additionally:
- a plurality of electrical leads connected to said semiconductor light source; and
- a plurality of electrical leads connected to said photoresponsive device;
- said leads extending to an edge of said transducer for connection to an edge connector whereby said edge connector fixes the spatial orientation of said transducer.

* * * * *